(12) United States Patent
Wu et al.

(10) Patent No.: US 10,508,827 B2
(45) Date of Patent: Dec. 17, 2019

(54) VENTILATING DEVICE

(71) Applicants: Panasonic Ecology Systems Guangdong Co., Ltd., Guangdong (CN); Panasonic Corporation, Osaka (JP)

(72) Inventors: Kunran Wu, Guangdong (CN); Junjie Ma, Guangdong (CN); Kouji Iio, Aichi (JP)

(73) Assignees: PANASONIC ECOLOGY SYSTEMS GUANGDONG CO., LTD. (CN); PANASONIC CORPORATION (JP)

( * ) Notice: Subject to any disclaimer, the term of this patent is extended or adjusted under 35 U.S.C. 154(b) by 6 days.

(21) Appl. No.: 15/709,993

(22) Filed: Sep. 20, 2017

(65) Prior Publication Data

US 2018/0080680 A1 Mar. 22, 2018

(30) Foreign Application Priority Data

Sep. 22, 2016 (CN) .......................... 2016 2 1071670

(51) Int. Cl.
| | |
|---|---|
| F24F 13/22 | (2006.01) |
| F24F 12/00 | (2006.01) |
| F24F 1/0057 | (2019.01) |
| F24F 110/40 | (2018.01) |

(52) U.S. Cl.
CPC .......... *F24F 13/222* (2013.01); *F24F 12/006* (2013.01); *F24F 1/0057* (2019.02); *F24F 2110/40* (2018.01); *Y02B 30/563* (2013.01)

(58) Field of Classification Search
CPC ...... F24F 1/00; F24F 2001/0048; F24F 12/00; F24F 12/001; F24F 12/006; F24F 13/00; F24F 13/20; F24F 13/22; F24F 13/222; F24F 2110/00; F24F 2110/40; F25D 21/00; F25D 21/04; F25D 21/14; F16B 19/00; F16B 21/02; F16B 21/04; G01F 1/46; G01F 15/18
USPC .................... 62/272, 285, 291; 165/54, 11.1; 454/237, 238, 241, 244, 248, 249, 251, 454/252; 411/349, 549; 73/861.65
See application file for complete search history.

(56) References Cited

U.S. PATENT DOCUMENTS

| | | | | |
|---|---|---|---|---|
| 4,208,944 | A | * | 6/1980 | Moryl .................. F16B 37/043 411/182 |
| 4,762,437 | A | * | 8/1988 | Mitomi .................. F16B 21/02 24/297 |
| 4,965,422 | A | * | 10/1990 | Liu .................... H01H 35/2628 200/83 R |

(Continued)

*Primary Examiner* — Paul Alvare
*Assistant Examiner* — Gustavo A Hincapie Serna
(74) *Attorney, Agent, or Firm* — RatnerPrestia

(57) ABSTRACT

A ventilating device includes a frame forming an outer contour, an airflow path formed by a flowing of air inside the frame, and a plurality of orifices configured to measure a static pressure in a chamber where the airflow path is located, wherein at least one orifice of the plurality of orifices is further configured to drain water out of the frame. In the present disclosure, the orifice for static pressure measurement is provided in the air supply path and/or the air discharge path at a position where the dew is dominantly accumulated, the drainage function and the function of measuring the static pressure may be realized simultaneously, reducing the cost and ensuring air tightness.

12 Claims, 14 Drawing Sheets

(56) References Cited

U.S. PATENT DOCUMENTS

| | | | | |
|---|---|---|---|---|
| 4,973,208 A * | 11/1990 | Gauron | ............... | B29C 70/68 411/258 |
| 5,632,582 A * | 5/1997 | Gauron | ............... | F16B 5/01 411/108 |
| 6,435,790 B1 * | 8/2002 | Ichikawa | ............... | F16B 5/0642 24/453 |
| 6,802,225 B2 * | 10/2004 | Shahar | ............... | A61B 5/087 73/861.52 |
| 6,883,389 B2 * | 4/2005 | Eldridge | ............... | G01F 1/46 73/861.65 |
| 7,565,923 B2 * | 7/2009 | Liu | ............... | F23L 15/02 165/104.21 |
| 7,955,038 B2 * | 6/2011 | Silbereisen | ............... | F16B 19/008 24/663 |
| 8,221,041 B2 * | 7/2012 | Hauser | ............... | F16B 5/10 411/349 |
| 8,297,870 B2 * | 10/2012 | Lenhart | ............... | A45B 9/00 135/75 |
| 8,397,565 B1 * | 3/2013 | Dillon | ............... | G01F 1/46 73/170.11 |
| 8,550,459 B2 * | 10/2013 | Sekiguchi | ............... | B65H 7/02 271/152 |
| 8,753,055 B2 * | 6/2014 | Ruckel | ............... | F16B 37/0842 411/182 |
| 8,807,900 B2 * | 8/2014 | Ramsauer | ............... | E05B 9/084 411/347 |
| 9,285,288 B2 * | 3/2016 | Ifft | ............... | G01F 15/00 |
| 9,599,140 B2 * | 3/2017 | Diep | ............... | F16B 37/04 |
| 9,982,699 B2 * | 5/2018 | Risdale | ............... | F16B 19/002 |
| 2001/0013404 A1 * | 8/2001 | Lagace | ............... | F24F 3/1423 165/8 |
| 2002/0084059 A1 * | 7/2002 | Rittberger | ............... | F28D 9/005 165/54 |
| 2002/0153133 A1 * | 10/2002 | Haglid | ............... | F24F 5/0035 165/231 |
| 2003/0156919 A1 * | 8/2003 | Schwarz | ............... | F16B 37/045 411/349 |
| 2008/0271874 A1 * | 11/2008 | Gietzen | ............... | F28D 7/1615 165/54 |
| 2015/0241081 A1 * | 8/2015 | McKie | ............... | F24F 12/006 165/233 |
| 2015/0338122 A1 * | 11/2015 | Byne | ............... | F24F 13/12 165/54 |
| 2015/0369269 A1 * | 12/2015 | Holt | ............... | F16B 5/0241 411/108 |
| 2016/0123608 A9 * | 5/2016 | Karamanos | ............... | F24F 13/04 165/210 |

* cited by examiner

VENTILATING DEVICE

BACKGROUND OF THE INVENTION

Field of the Invention

The present disclosure relates to a ventilating device, and more particularly to a ventilating device having an orifice capable of both measuring static pressure and draining water out.

Description of the Related Art

In order to facilitate the operator to detect and set the air volume according to the size of the room after installing a heat exchanger 1, in the conventional art, a static pressure orifice 3 is installed on a frame 2 of the heat exchanger 1, as shown in FIG. 1. When the air volume is required to be measured, the static pressure in the heat exchanger 1 may be measured as long as the operator places a static pressure gauge against a static pressure orifice 3. According to the measured data, the appropriate amount of air volume may be adjusted.

In the winter, when the heat exchanger 1 is started, since the air entering from outside and the air entering from the room are flowed in the heat exchanger 1, alternative cooling and heating is liable to take place in the heat exchanger 1 such that the dew accumulates in the heat exchanger. Since the user is aware not of the accumulated dew in the heat exchanger 1, when he/she needs to open the panel 4 of the heat exchanger 1 installed on the ceiling for inspection or maintenance, the accumulated water will wet the user or articles in the room. Therefore, in the conventional art, not only the static pressure orifice 3 is provided on the heat exchanger 1, but also the drain orifice 5 is provided on the heat exchanger 1, as shown in FIG. 1.

In the process of implementation, the applicant has gradually realized that the provisions of the static pressure orifice 3 and the drain orifice 5 on the heat exchanger 1 not only increases the cost and easily confuses the user, but also deteriorates the airtightness of the heat exchanger 1 and adversely affect performance thereof.

SUMMARY OF THE INVENTION

(I) Technical Problems to be Solved

In order to solve the above-mentioned problems, the present disclosure provides a ventilating device having an orifice capable of both measuring a static pressure and draining water out.

(II) Technical Solution

According to one aspect of the present disclosure, there is provided a ventilating device, comprising a frame forming an outer contour, an airflow path formed by a flowing of air inside the frame, and a plurality of orifices configured to measure a static pressure in a chamber where the airflow path is located, wherein at least one orifice of the plurality of orifices is further configured to drain water out of the frame.

Preferably, in the ventilating device of the present disclosure, the airflow path comprises an air supply path for allowing the air to flow from outside to a room, and an air discharge path for allowing the air to flow from the room to outside; a heat exchanging element for exchanging energy between indoor air and outdoor air is provided at an intersection position between the air supply path and the air discharge path; and the plurality of orifices are provided in the airflow path at a position where the air hasn't reached the heat exchanging element yet or in the airflow path at a position where the air has already left the heat exchanging element.

Preferably, in the ventilating device of the present disclosure, a surface of the frame is provided with a panel capable of being opened and closed, and the plurality of orifices are provided on the panel.

Preferably, in the ventilating device of the present disclosure, a fixing bolt for fixing a measuring tube of different sizes of a static pressure gauge is provided in each of the plurality of orifices.

Preferably, in the ventilating device of the present disclosure, the fixing bolt comprises a fixing bolt body of a hollow truncated cone shape, the fixing bolt body comprising: a first bottom surface extending into the frame and provided with a first opening, and a second bottom surface positioned outside of the frame and provided with a second opening.

Preferably, in the ventilating device of the present disclosure, the fixing bolt further comprises an outer flange provided in an insertion direction of the measuring tube and having a larger diameter than that each of the plurality of orifice; a stopper extending outwardly in a rotational direction of the fixing bolt is provided on a surface of the outer flange facing the fixing bolt body, and the outer flange is formed with a third opening communicating with the second opening; one end of the stopper is provided with a hook portion and the other end thereof is provided with a connecting portion connected to the outer flange; and each of the plurality of the orifices comprises a main orifice portion through which the fixing bolt body passes, and a lateral orifice portion through which the stopper passes.

Preferably, in the ventilating device of the present disclosure, an observation hole corresponding to the stopper is provided on the outer flange; and a recess or a projection is provided on the outer flange.

Preferably, in the ventilating device of the present disclosure, the ventilating device further comprises a cover, wherein the cover comprises a covering portion covering the third opening, and an engaging portion adapted to be engaged into the second opening; wherein the engaging portion is provided with a notch for enabling deformation of the engaging portion, and a gap is formed between the covering portion and the third opening.

Preferably, in the ventilating device of the present disclosure, an inner wall of the panel is provided with a thermal insulating member preventing heat exchange between the air inside the ventilating device and the air outside the ventilating device, and the thermal insulating member is provided with a guide hole penetrating through the thermal insulating member.

Preferably, in the ventilating device of the present disclosure, a water storage portion recessed towards the panel is formed on the thermal insulating member, and the guide hole is provided at a lowest point of the water storage portion.

Preferably, in the ventilating device of the present disclosure, the ventilating device is an air blower or a heat exchanger.

(III) Beneficial Effects (1) since the orifice for static pressure measurement is provided in the air supply path and/or the air discharge path at a position where the dew is dominantly accumulated, the drainage function and the function of measuring the static pressure may be realized simultaneously, reducing the cost and ensuring air tightness;

(2) since the orifice is provided on the panel, it not only facilitates the user to directly place the measuring tube of the static pressure gauge into the orifice for measuring, but also facilitates the dew to gather up to the orifice located at a lower position due to gravity so as to ease the drainage, and thus easy the use and the maintenance;

(3) when the dew needs to be drained away, the dew accumulated in the heat exchanger flows out of the orifice as long as the user removes the fixing bolt provided in the orifice before opening the panel, thereby easing the drainage. Since the dew has been discharged, the user opening the panel will not be wetted;

(4) on the fixing bolt, the outer flange provided in the insertion direction of the measuring tube has a larger diameter than that of the orifice in the panel so that the outer flange cannot be inserted into the orifice to prevent the fixing bolt from falling into the frame;

(5) two stoppers extending outwardly in the rotational direction of the fixing bolt body are provided on the second bottom surface, and one end of the stopper is provided with a hook portion and the other end thereof is provided with a connecting portion connected to the outer flange. By means of this kind of design, it is easy to mount and remove the fixing bolt, improving the operability of the product.

(6) the cover is provided at the opening of the fixing bolt, and by providing a notch at the engaging portion of the cover, the cover may be reliably engaged into the fixing bolt. By providing a gap around the covering portion, it may be convenient to remove the cover, and the measurement for the static pressure may be performed as long as the cover has been removed;

(7) the water storage portion is formed on the thermal insulating member, and the guide hole is provided at the lowest point of the water storage portion, and in this way, the dew in the heat exchanger may gather in the water storage portion and finally flow out through the guide hole at the lowest point, thereby facilitating the drainage and ensuring the airtightness.

MAIN COMPONENTS

100—frame
111—outdoor air inlet; 112—indoor air inlet;
113—indoor air outlet; 114—outdoor air outlet;
120—panel;
121—orifice;
121a—main orifice portion; 121b—lateral orifice portion;
130—thermal insulating member;
131—guide hole;
210—air supply path; 220—air discharge path; 230—heat exchanging element;
211—air supply fan; 221—air discharge fan;
241, 241'—first orifice;
242,242'—second orifice
243, 243'—third orifice;
244, 244'—fourth orifice
300—fixing bolt;
310—fixing bolt body;
311—first bottom surface; 311'—first opening;
312—second bottom surface; 312'—second opening;
320—outer flange;
321—stopper; 321a—hook portion; 321b—connecting portion;
322—observation hole; 321b—connecting portion;
323—projection; 324 recess;
320'—third opening;
400—cover;
410—covering portion; 411—gap;
420—engaging portion; 421—notch;
A—outdoor air intake area; B—indoor air outtake area;
C—indoor air intake area; D—outdoor air outtake area;
E—water storage portion.

DETAILED DESCRIPTION OF PREFERRED EMBODIMENTS OF THE INVENTION

In the present disclosure, a part (or all) of the orifices for static pressure measurement is used for drainage, thereby reducing the cost of the ventilating device and improving the convenience of use.

In order to make the purpose, technical solutions and advantages of the present disclosure more obvious, the present disclosure will be described in more detail with reference to the accompanying drawings.

The ventilating device of the present disclosure includes an air blower and a heat exchanger. In the following, the heat exchanger is mainly described as an example. Depending on the description, those skilled in the art will appreciate the relevant structure and working principle of the air blower.

In an exemplary embodiment of the present disclosure, there is provided a heat exchanger. The heat exchanger may be mounted on a ceiling or mounted on a wall or a basement.

Figure 1:
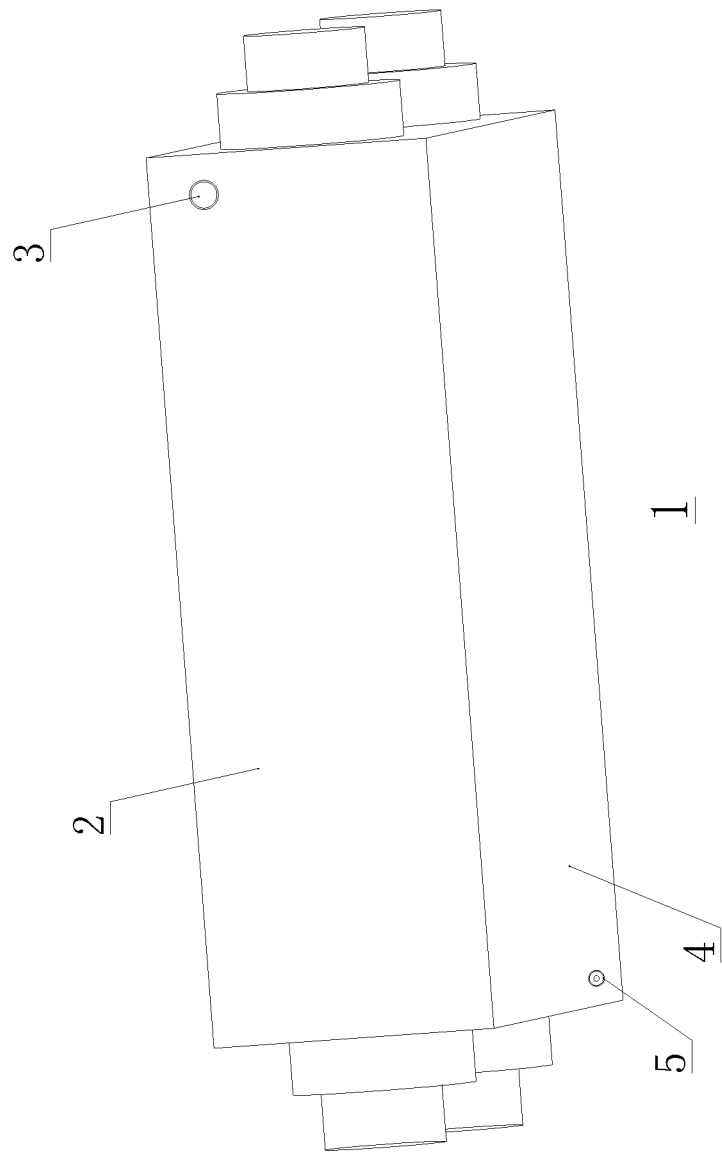
FIG. 1 is a schematic view of ventilating device in the conventional art.
Figure 2:
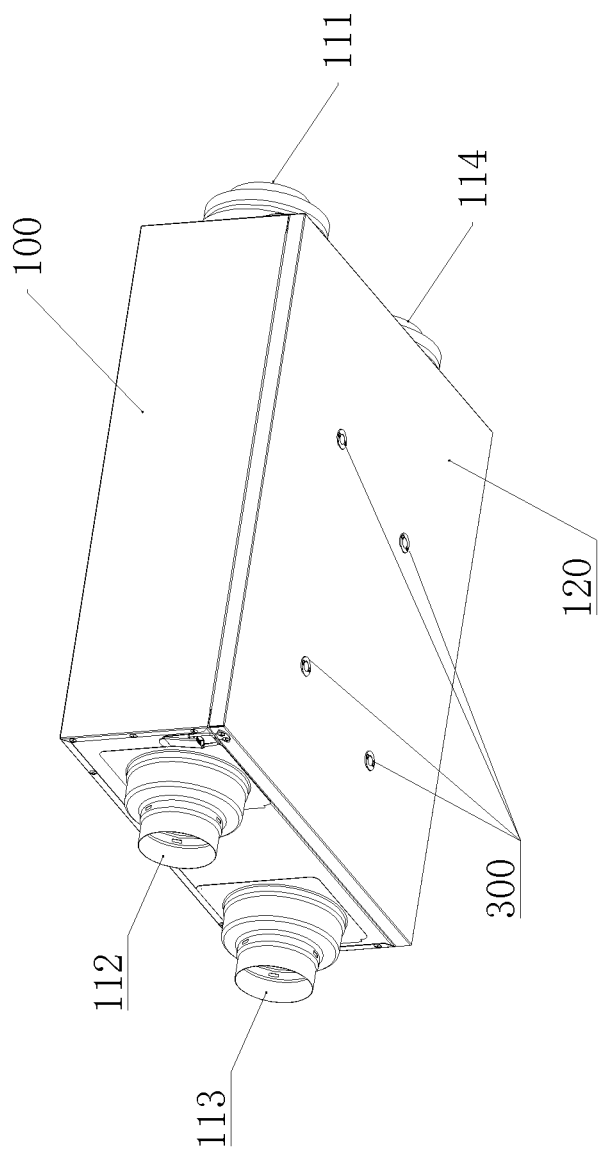
FIG. 2 is an overall schematic view of a heat exchanger according to an embodiment of the present disclosure.
Figure 3:
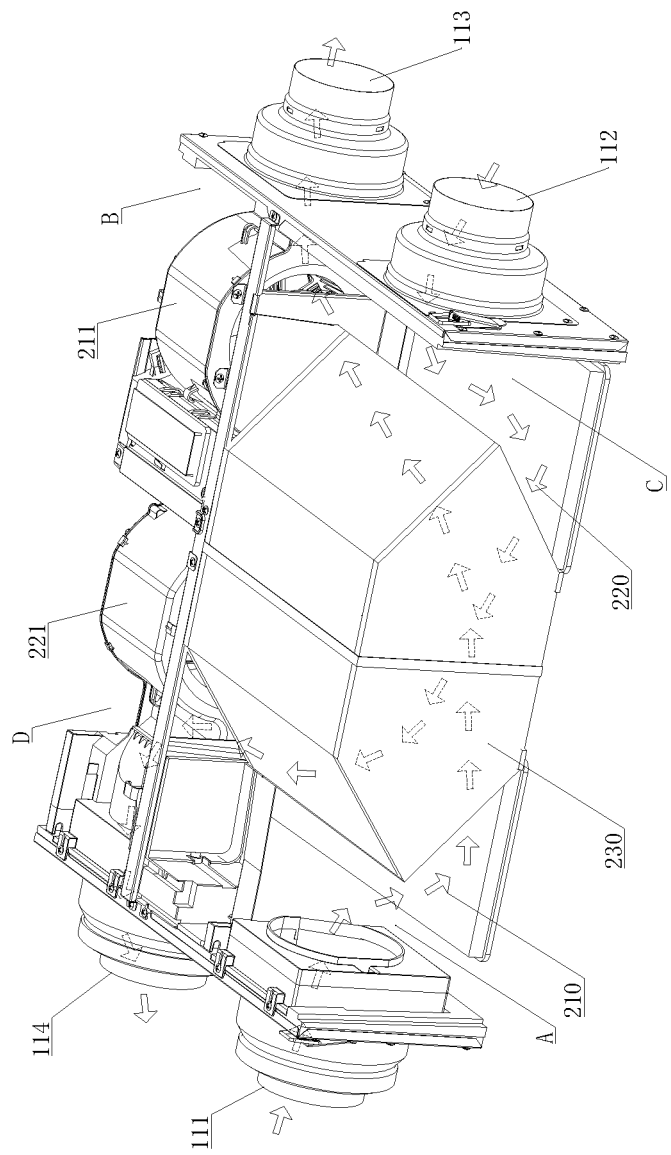
FIG. 3 shows schematic view of an internal structure and airflow path of the heat exchanger shown in FIG. 2 with a panel and two side surfaces of the frame of the heat exchanger removed.
Figure 4:
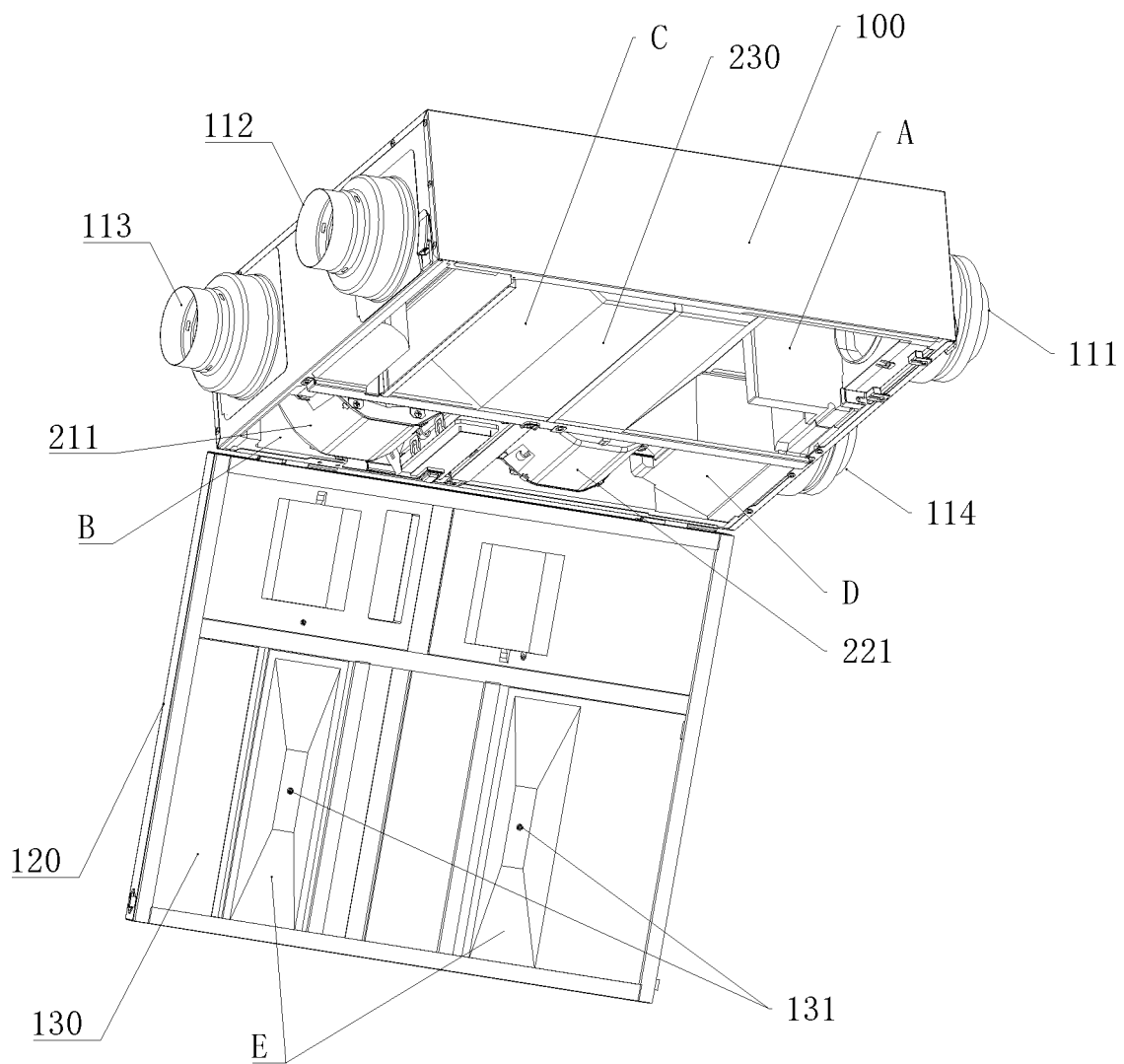
FIG. 4 is a schematic view of the heat exchanger shown in FIG. 2 with the panel opened.

As an example, the following description is illustrated in which the heat exchanger is installed on the ceiling. As shown in FIGS. 2 to 4, the heat exchanger of the present embodiment includes a frame 100 forming an outer contour, an airflow path formed by the flowing of air in the frame 100, and a plurality of orifices 121 for measuring the static pressure in a chamber where the airflow path is located. At least one orifice of the plurality of orifices 121 is further configured to drain water out of the frame 100.

The various components of the heat exchanger of the present embodiment will be described in detail below.

Referring to FIGS. 2 to 4, the frame 100 is of a hollow rectangular parallelepiped shape and comprises: four side surfaces; a top surface; a panel 120 capable of being opened downwards and closed upwards; and an thermal insulating member 130 applied on six inner surfaces of the frame 100 and configured to prevent heat exchange between the air inside the heat exchanger and the air outside the heat exchanger.

An outdoor air inlet 111 for allowing outdoor air to enter into the frame 100, an indoor air inlet 112 for allowing the indoor air to enter into the frame 100, an indoor air outlet 113 for discharging the air in the frame 100 to the room, and an outdoor air outlet 114 for discharging the air in the frame 100 to the outside are provided on the frame 100.

Continuing to refer to FIG. 3, for the heat exchanger, the airflow path includes: (1) an air supply path 210 for allowing the air to flow from the outside to the room; and (2) an air discharge path 220 for allowing the air to flow from the room to the outside. A heat exchanging element 230 for exchanging energy between the indoor air and the outdoor air is provided at the intersection position between the air supply path 210 and the air discharge path 220. As shown in FIG. 4, the heat exchanging element 230 divides the heat exchanger into an outdoor air intake area A, an indoor air outtake area B, an indoor air intake area C, and an outdoor air outtake area D.

Continuing to refer to FIG. 3, an air supply fan 211 provided in the indoor air outtake area B may suck outdoor air from the outdoor air inlet 111 into the frame 100 and then discharge it out from the indoor air outlet 113. For the entire air supply path 210, the outdoor air enters from the outdoor air inlet 111, passes through the heat exchanging element 230 and the air supply fan 211, and finally enters the room through the indoor air outlet 113.

Continuing to refer to FIG. 3, an air discharge fan 221 provided in the outdoor air outtake area D may suck the indoor air from the indoor air inlet 112 into the frame 100 and discharge it out from the outdoor air outlet 114. For the entire air discharge path 220, the indoor air enters from the indoor air inlet 112, passes through the heat exchanging element 230 and the air discharge fan 221, and finally is discharged to the outside through the outdoor air outlet 114.

Referring to FIG. 4, the orifices 121 may be provided in the airflow path at a position where the air hasn't reached the heat exchanging element 230 yet or in the airflow path at a position where the air has already left the heat exchanging element 230.

In the present exemplary embodiment, the orifices 121 comprises four orifices 241, 242, 243 and 244, i.e. a first orifice 241 provided in the air supply path 210 at a position where the air hasn't reached the heat exchanging element 230 yet; a second orifice 242 provided in the air supply path 210 at a position where the air has already left the heat exchanging element 230; a third orifice 243 provided in the air discharge path 220 at a position where the air hasn't reached the heat exchanging element 230 yet; a fourth orifice 244 provided in the air discharge path 220 at a position where the air has already left the heat exchanging element 230.

Referring to FIGS. 3 and 4, when the air supply fan 211 is activated, the outdoor air enters the outdoor air intake area A of the heat exchanger through the outdoor air inlet 111 and then enters the indoor air outtake area B of the heat exchanger after passing through the heat exchanging element 230. At this time, the air coming from the outdoor air intake area A suffers from a reduction in pressure after passing through the heat exchanging element 230 due to the resistance of the heat exchanging element 230, such that the static pressure in the indoor air outtake area B is not the same as the static pressure in the outdoor air intake area A. When the static pressure in the air supply path 210 needs to be measured, by means of a static pressure gauge, the static pressure in the outdoor air intake area A is measured at the first orifice 241 provided in the air supply path 210 at a position where the air hasn't reached the heat exchanging element 230 yet, and the static pressure in the indoor air outtake area B is measured at the second orifice 242 provided in the air supply path 210 at a position where the air has already left the heat exchanging element 230. In this way, the difference in the static pressure of the air supply path 210 is calculated from the measurements obtained at above-mentioned two orifices.

Similarly, when the air discharge fan is started, the static pressure in the indoor air intake area C is measured at the third orifice 243 provided in the air discharge path 220 at a position where the air hasn't reached the heat exchanging element 230 yet, and then the static pressure in the outdoor air outtake area D is measured at the fourth orifice 244 provided in the air discharge path 220 at a position where the air has already left the heat exchanging element 230, and the difference in the static pressure between these two areas (the indoor air intake area C, and the outdoor air outtake area D) can be measured and the difference in the static pressure of the air discharge path 220 is obtained by calculation.

Finally, the air volume suitable for the room is adjusted according to the difference in the static pressure of the air supply path 210 and the difference in the static pressure of the air discharge path 220.

In the present embodiment, since the orifices 121 for the static pressure measurement are provided in the air supply path 210 and/or the air discharge path 220 at a position where the dew is dominantly accumulated, the drainage function may be realized at the same time. In this way, another orifice for water drainage provided at another places will be eliminated, thereby reducing the cost and ensuring air tightness. The one skilled in the art can determine as desired whether all of the orifices 121 or a part of the orifices 121 or even only one orifice 121 for the static pressure measurements are/is used for water drainage.

Referring to FIG. 4, a panel 120 capable of being opened and closed is provided on one surface of the frame 100. The panel 120 is connected to the frame 100 by a hinge structure. In order to facilitate the user to open the panel 120 for inspection or maintenance, when the heat exchanger is installed on the ceiling, the panel 120 capable of being opened and closed may be provided at the lower side of the frame 100. Thus, the orifices 121 provided on the panel 120 not only facilitates the user to directly place the measuring tube of the static pressure gauge into one of the orifices 121 for measuring, but also facilitates the dew to gather up to the orifice 121 located at the lower side of the frame 100 due to gravity so as to facilitate the drainage.

Figure 6A:
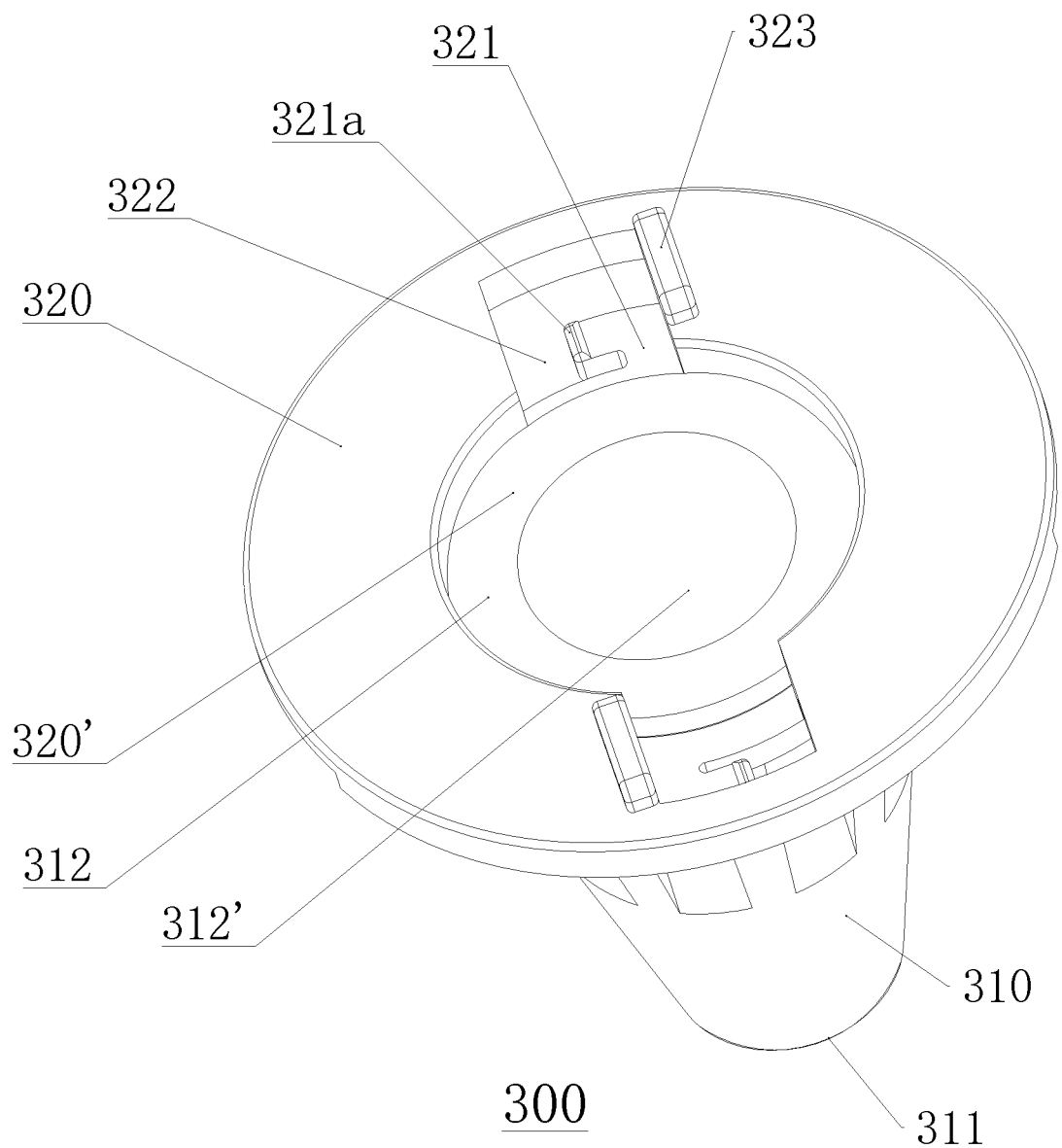
FIG. 6A is a perspective view of a fixing bolt in the heat exchanger shown in FIG. 2.
Figure 6B:
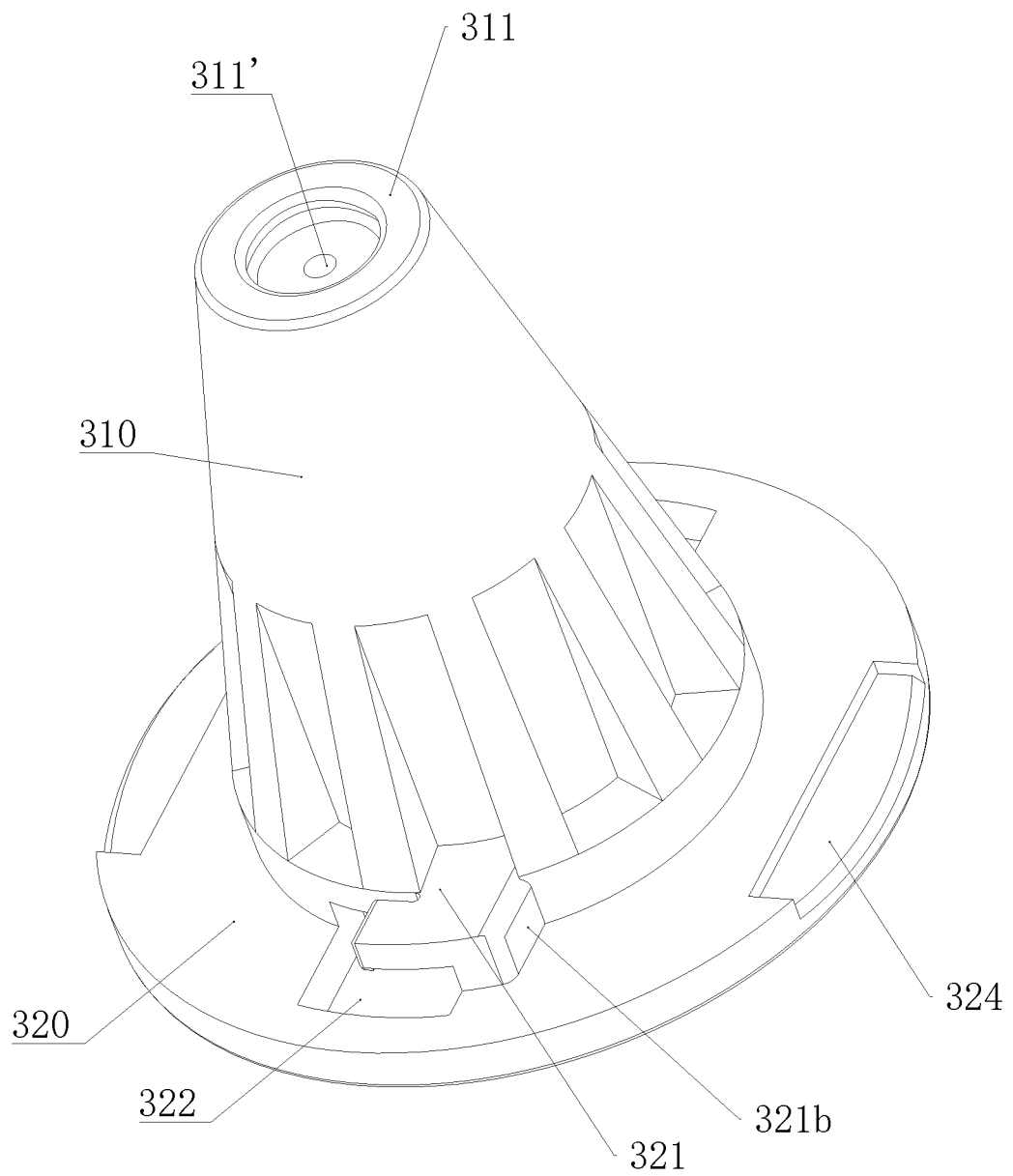
FIG. 6B is a perspective view of the fixing bolt shown in FIG. 6A viewed from a different viewpoint.
Figure 6C:
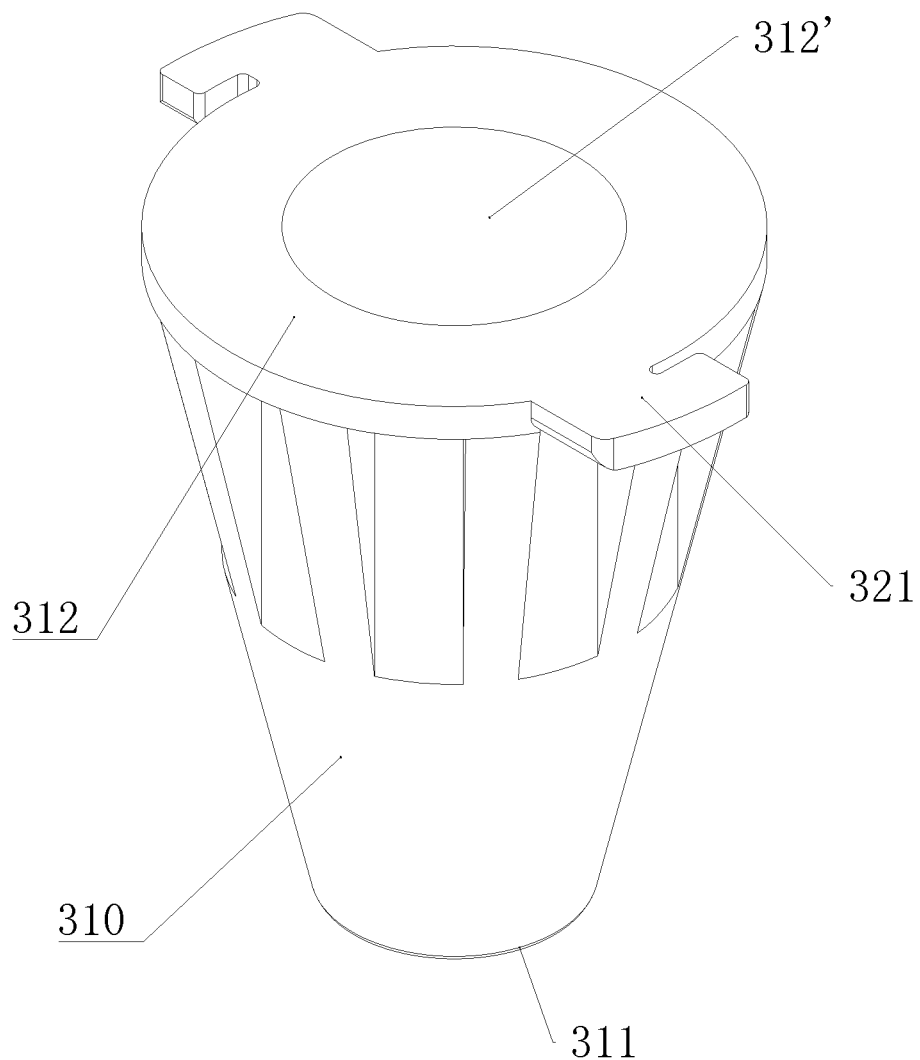
FIG. 6C is a schematic view of a fixing bolt body in the fixing bolt shown in FIG. 6A.

Referring to FIGS. 6A, 6B and 6C, a fixing bolt 300 for fixing a measuring tube of different sizes of the static pressure gauge is provided in each of the orifices 121. The fixing bolt 300 includes a fixing bolt body 310; an outer flange 320 provided in the insertion direction of the measuring tube and having a larger diameter than that of each of the orifices 121. The fixing bolt body 310 and the outer flange 320 may be integrally formed, or may be formed separately.

The fixing bolt body 310 is a hollow truncated cone partially inserted into the frame 100. The fixing bolt body 310 includes a first bottom surface 311 extending into the frame 100 and a second bottom surface 312 positioned outside of the frame 100 and having a larger area than that of the first bottom surface 311. A first opening 311' is provided in the first bottom surface 311, and a second opening 312' is provided in the second bottom surface 312.

When the static pressure needs to be measured, since the fixing bolt body 310 is of a hollow truncated cone shape, the measuring tube of different diameters of the static pressure gauge may be fixed therein. When the fixing bolt 300 is mounted, the smaller portion of the truncated cone is placed on the inner side of the ventilating device. In this way, the measuring tube is inserted from the second opening 312' of the second bottom surface having a larger area until it comes into contact with the inner wall of the fixing bolt 300. At this time, the measuring tube is fixed in the fixing bolt 300 and cannot be moved in the left and right direction, ensuring the airtightness between the measuring tube and the orifice 121. In this way, the static pressure inside the heat exchanger may be measured by the static pressure gauge through the first opening 311' in the first bottom surface 311 communicating with the interior of the heat exchanger.

When the dew needs to be drained out, the dew accumulated in the heat exchanger flows out of the orifice 121 as long as the user removes the fixing bolt 300 provided in the orifice 121 before opening the panel 120. Since the dew has been discharged, the user will not be wetted when the panel 120 is open.

Figure 5:
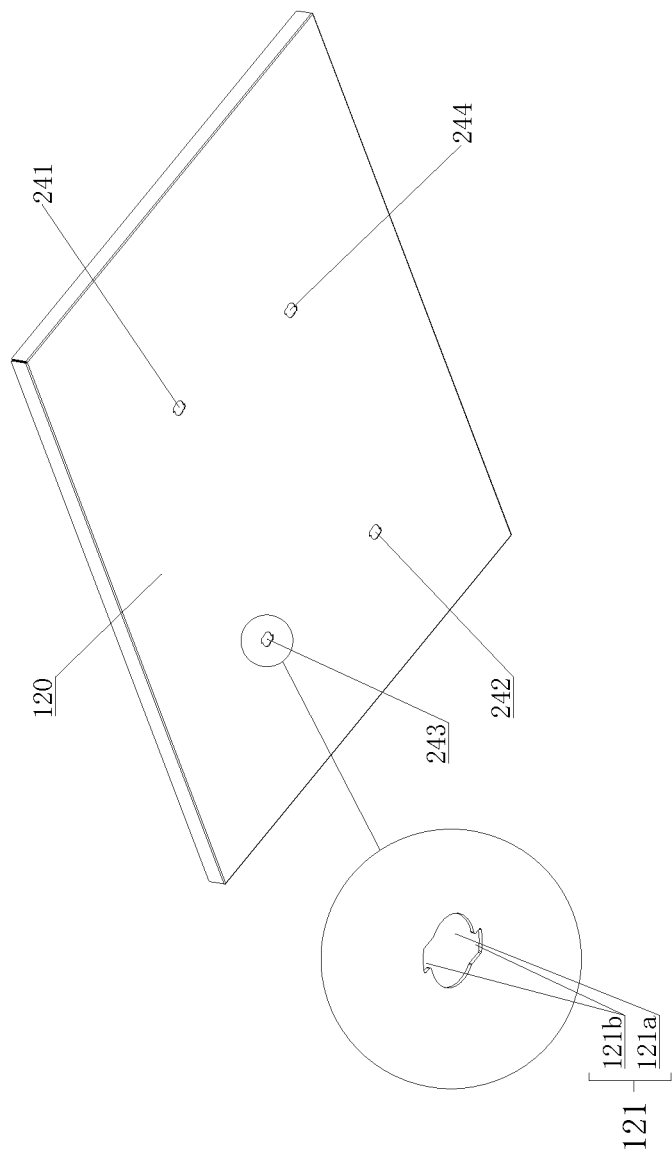
FIG. 5 is a schematic view of orifices formed in the panel of the heat exchanger shown in FIG. 2.

Referring to FIGS. 6A, 6B and 5, on the fixing bolt 300, the outer flange 320 provided in the insertion direction of the measuring tube has a larger diameter than that of the second opening 312'. The outer flange 320 is provided with a third opening 320' communicating with the second opening 312'. On the fixing bolt 300, since the outer flange 320 provided in the insertion direction of the measuring tube has a larger diameter than that each of the orifices 121 in the panel 120, the outer flange 320 cannot be inserted into the orifice 121 to prevent the fixing bolt 300 from falling into the frame 100.

In order to facilitate the installation and removal of the fixing bolt 300, a stopper 321 extending outwardly in a rotational direction of the fixing bolt body 310 is provided on a surface of the outer flange 320 facing the fixing bolt body 310. One end of the stopper 321 is provided with a hook portion 321a, and the other end thereof is provided with a connecting portion 321b connected to the outer flange 32, as shown in FIGS. 6A and 6B. Correspondingly, the orifice 121 in the panel 120 includes a main orifice portion 121a through which the fixing bolt body 310 may pass, and two lateral orifice portions 121b through which the stopper 321 may pass, as shown in FIG. 5.

Figure 7A:
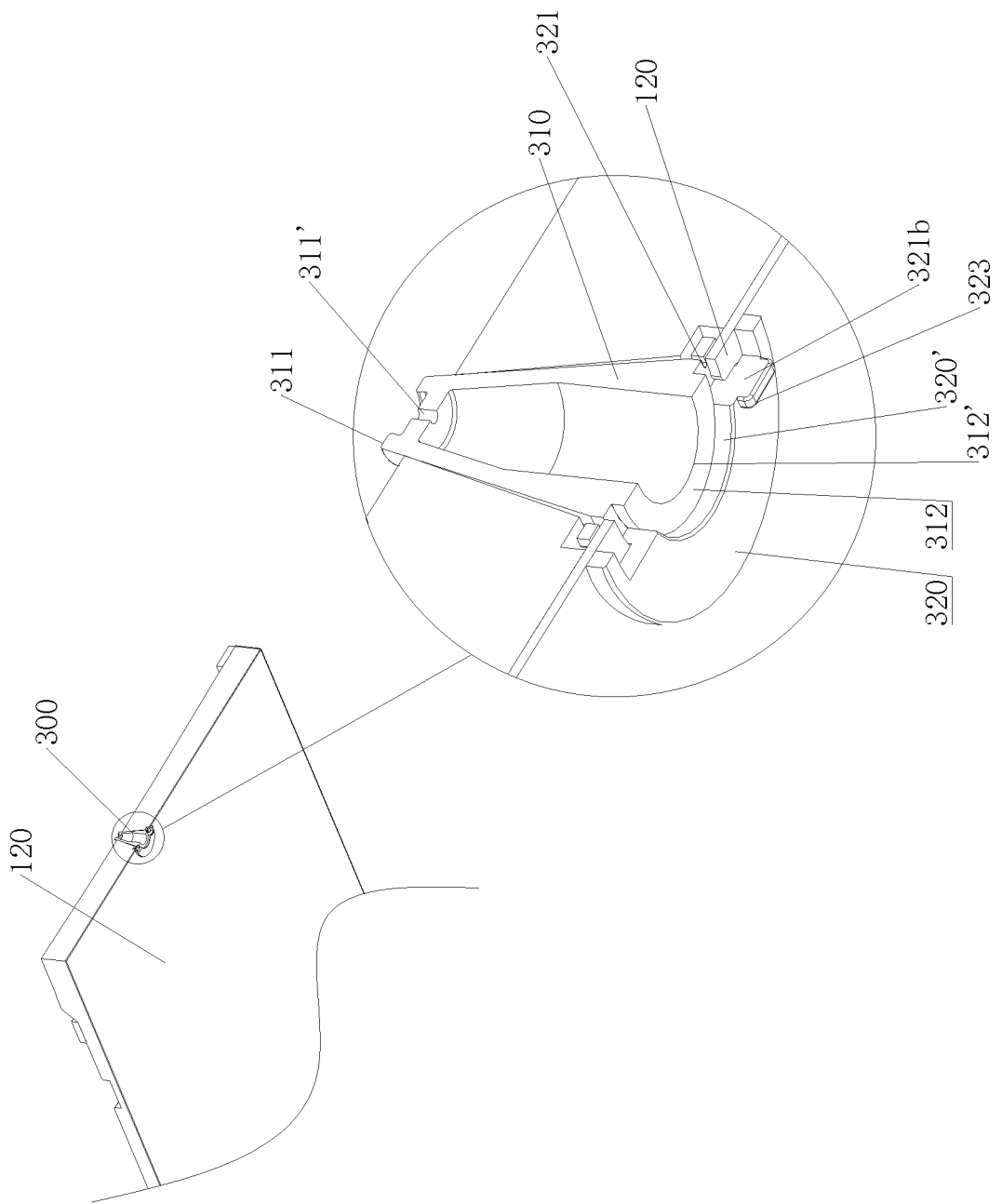
FIG. 7A is a cross-sectional perspective view of a state in which the fixing bolt is fixed to the panel in the heat exchanger shown in FIG. 2.

As shown in FIG. 7A, when the fixing bolt 300 is mounted, the smaller portion of the fixing bolt body 310 and the stoppers 321 are aligned with the main orifice portion 121a and the lateral orifice portions 121b, respectively, so that the fixing bolt 300 is inserted into the orifice 121. Then, the stopper 321 is rotated as the fixing bolt 300 is rotated, such that the hook portion 321a of the stopper 321 comes into contact with the inner wall of the frame 100 (or the inner surface of the panel 120), and when the stopper 321 is not aligned with the lateral orifice portion 121b and the connecting portion 321b comes into contact with the edge (the cross-sectional portion of the panel 120) of the lateral orifice portion 121b, the fixing bolt 300 is locked to the orifice 121.

Figure 7B:
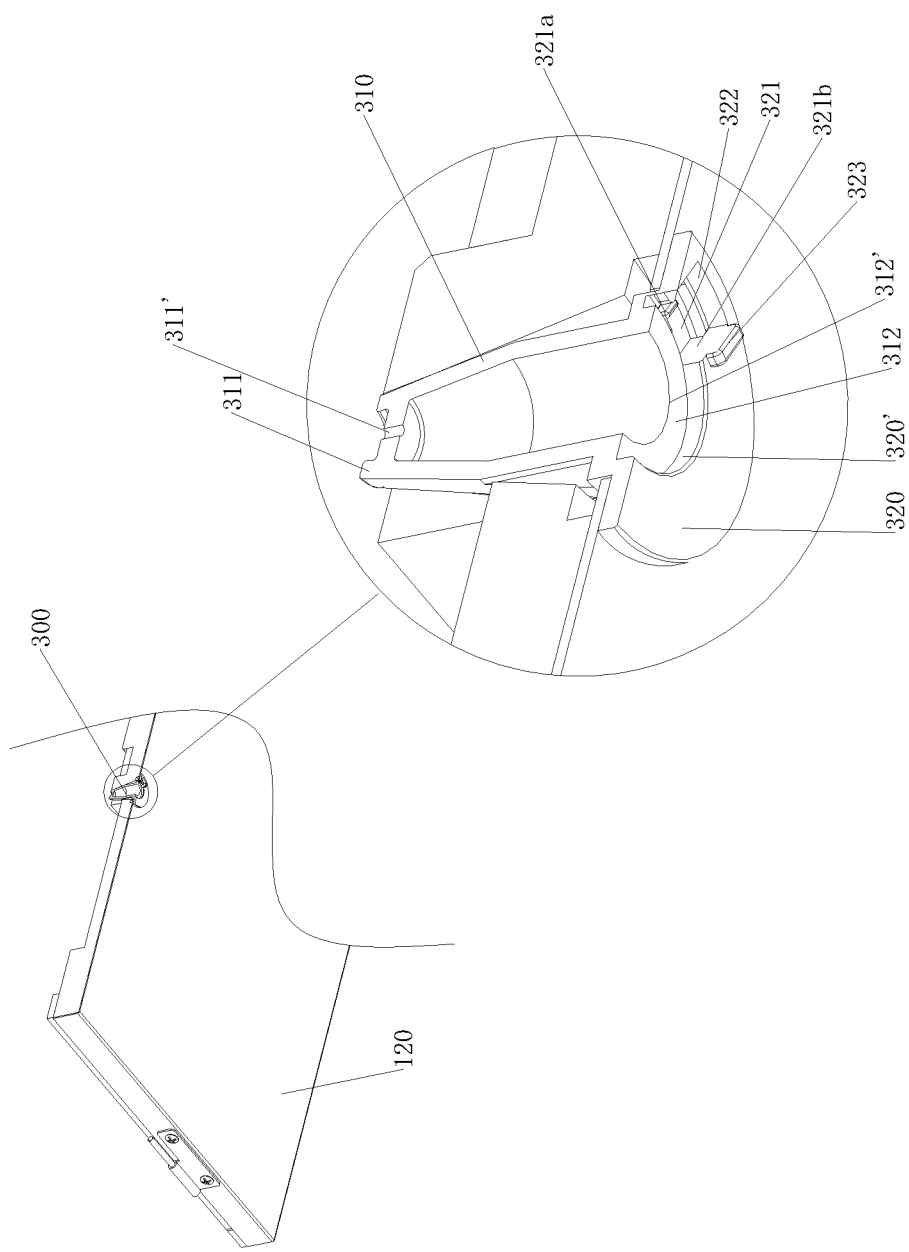
FIG. 7B is a cross-sectional perspective view of the fixing bolt mounted on the panel in the heat exchanger shown in FIG. 2 in a detachable state.

As shown in FIG. 7B, when the fixing bolt 300 needs to be removed, the fixing bolt 300 is rotated in the opposite direction such that the hook portion 321a of the stopper 321 doesn't come into contact with the inner wall of the frame 100 anymore. When the stopper 321 is aligned with the lateral orifice portion 121b, the fixing bolt may be removed from the orifice 121 in the panel 120.

In addition, as shown in FIGS. 6A and 6B, for the sake of convenience, an observation hole 322 corresponding to the stopper 321 is provided on the outer flange 320 to obtain and observe the state of the stopper 321. In addition, in order to facilitate the removal and rotation of the fixing bolt 300, two recesses 324 or two projections 323 are provided on a surface of the outer flange 320 facing outwards so that the fixing bolt 300 may be operated, removed or rotated by two fingers, thereby easily mounting and removing the fixing bolt 300 and improving the operability of the product.

Figure 8A:
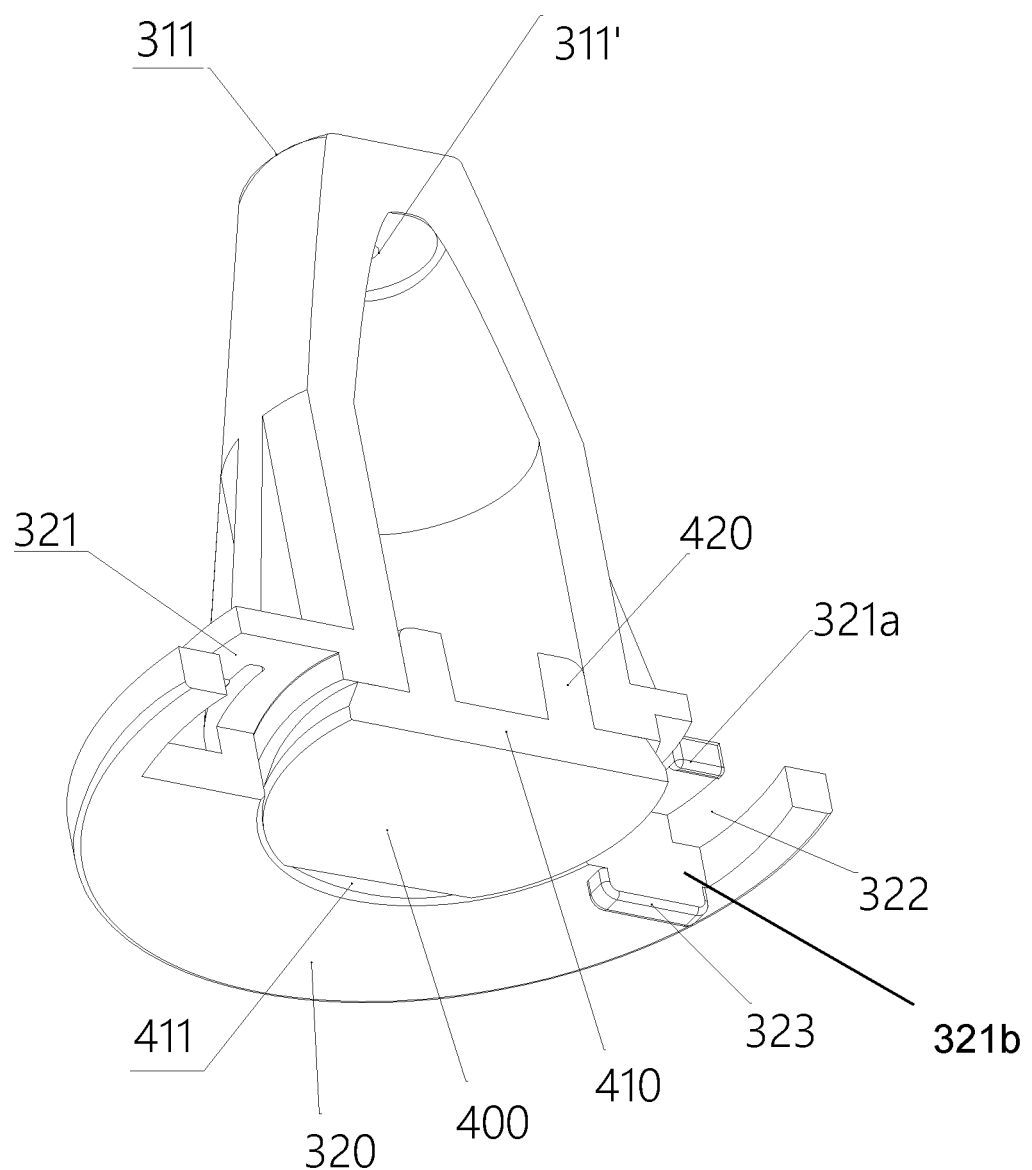
FIG. 8A is a cross-sectional perspective view of a cover together with the fixing bolt in which the cover is mounted in the heat exchanger shown in FIG. 2.
Figure 8B:
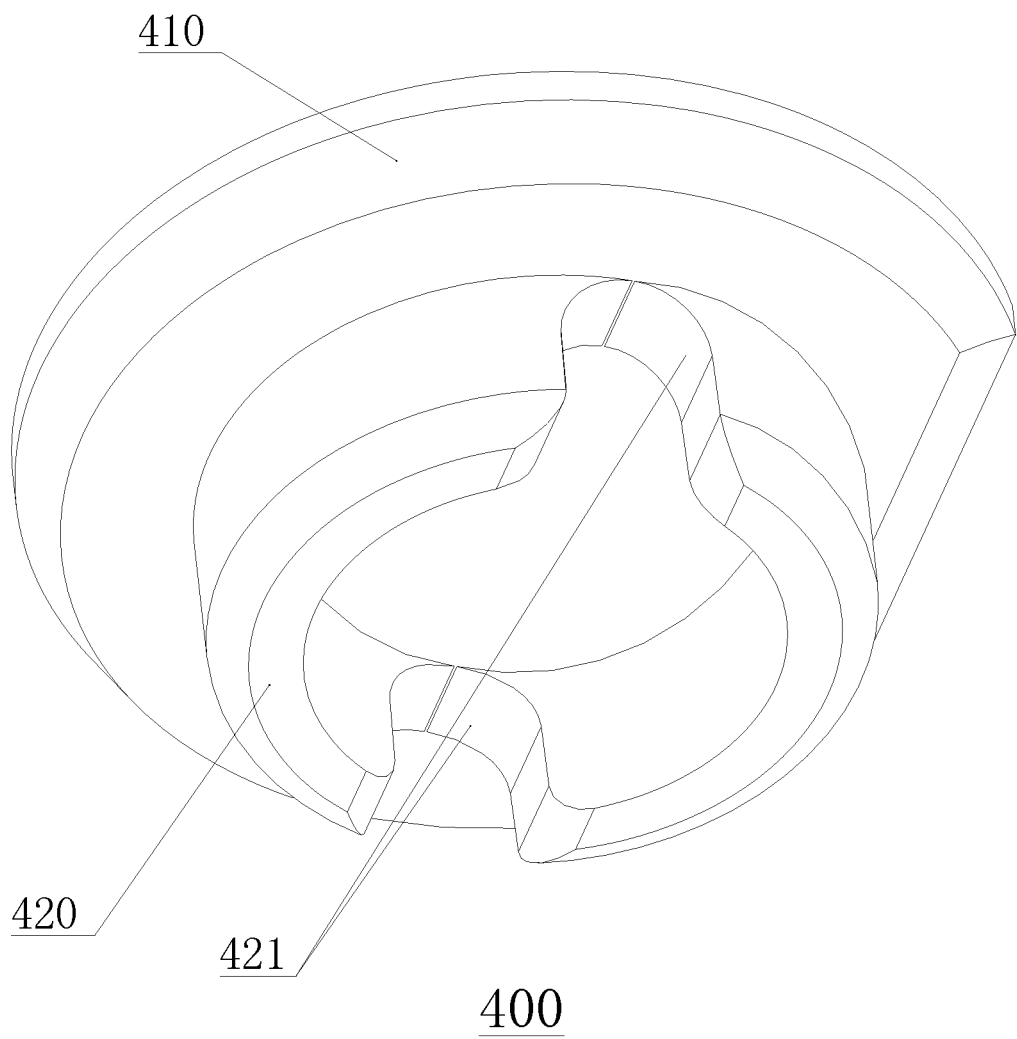
FIG. 8B is a perspective view of the cover shown in FIG. 8A.

Referring to FIGS. 8A and 8B, the heat exchanger of the present embodiment further includes a cover 400 for air tightness. The cover 400 includes a covering portion 410 covering the third opening 320', and an engaging portion 420 that engaged into the second opening 312'. The cover 400 not only prevents outside air from entering via the fixing bolt 300, but also prevents the dew from flowing out via the first opening 311' due to the air pressure after the cover 400 is inserted, as shown in FIGS. 8A and 2. Normally, the fixing bolt 300 is mounted with the cover 400 during operation. When the static pressure is to be measured, the user may place the measuring tube into the fixing bolt 300 by only removing the cover 400 only. When it's required to drain water or dew out, only the fixing bolt 300 with the cover 400 needs to be remove, without the necessity of removing the cover 400 separately. In other words, both the drainage and the static pressure measurement may be achieved by removing only one component.

Referring to FIG. 8B, the engaging portion 420 is provided with two notches 421 opposed to each other. When the cover 400 is required to be inserted, since the notches 421 are provided on the engaging portion 420, the engaging portion 420 may be inserted into the second opening 312' after being compressed and deformed, and the engaging portion 420 is restored to its original shape in the second opening 312' after being engaged into the second opening 312'.

In addition, the gap 411 is provided between the covering portion 410 and the third opening 320', so that when the cover 400 is required to be removed, the cover 400 may be removed by inserting fingers into the gap 411.

Figure 9:
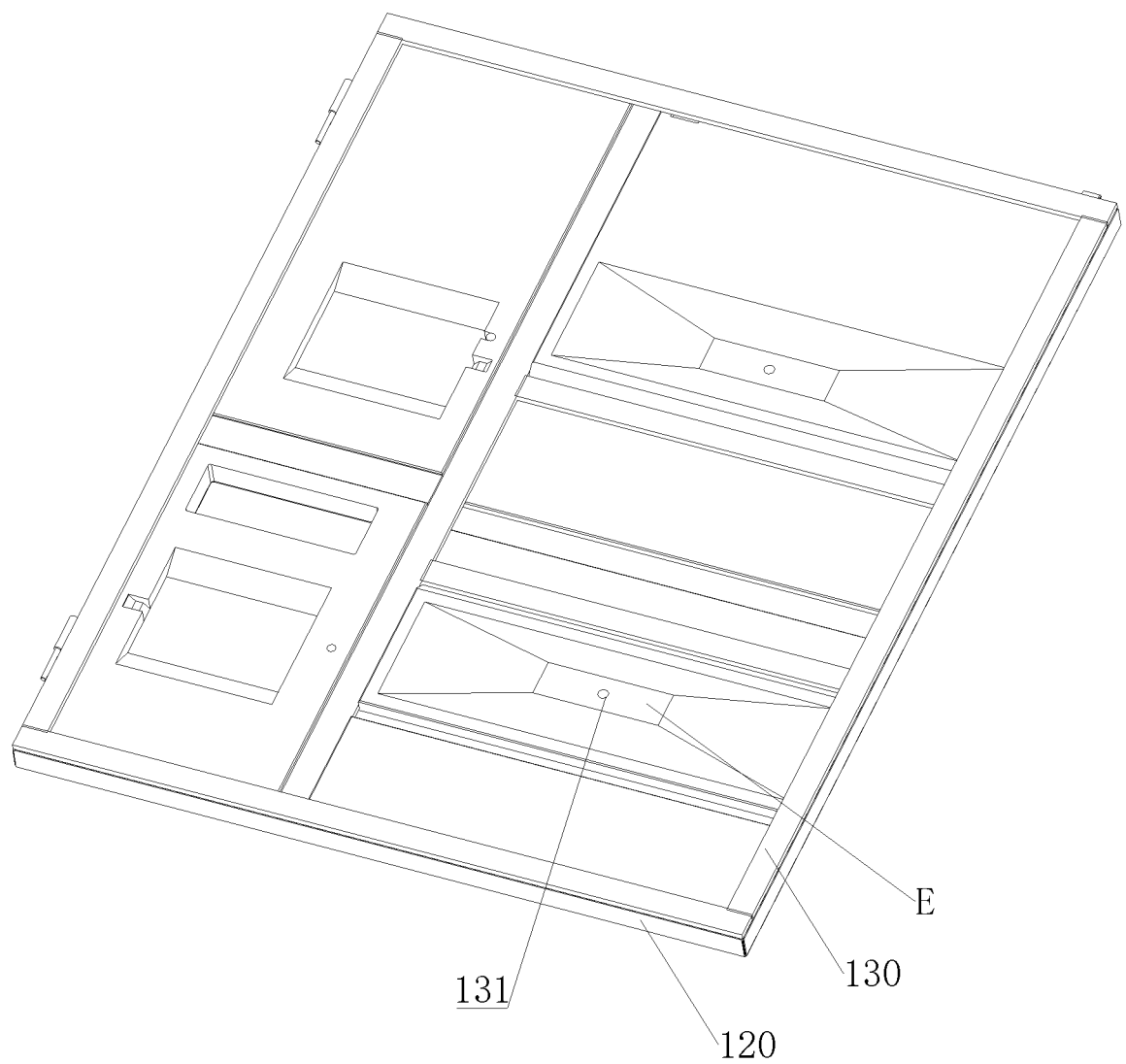
FIG. 9 is a schematic view of a thermal insulating member and the panel in the heat exchanger shown in FIG. 2.

Referring to FIG. 9, the inner wall of the panel 120 is provided with a thermal insulating member 130 preventing heat exchange between the air inside the ventilating device and the air outside the ventilating device. The thermal insulating member 130 may be formed by a material such as foam or a sponge.

In order to further improve the airtightness, a guide hole 131 penetrating through the thermal insulating member 130 is provided on the thermal insulating member 130 applied on the inner wall of the panel 120 and preventing heat exchange between the air inside the heat exchanger and the air outside the heat exchanger. When the fixing bolt 300 is inserted into the guide hole 131, the guide hole 131 surrounds the outer wall of the fixing bolt 300, and functions as a seal component such that outside air is blocked from entering into the interior of the panel through the gap between the fixing bolt 300 and the orifice 121.

A water storage portion E recessed towards the panel 120 is provided by the thermal insulating member 130, and the guide hole 131 is provided at the lowest point of the water storage portion E. In this way, the dew in the heat exchanger may gather in the water storage portion E and finally flow out through the guide hole 131 at the lowest point, thereby facilitating the drainage and ensuring the airtightness.

Figure 10:
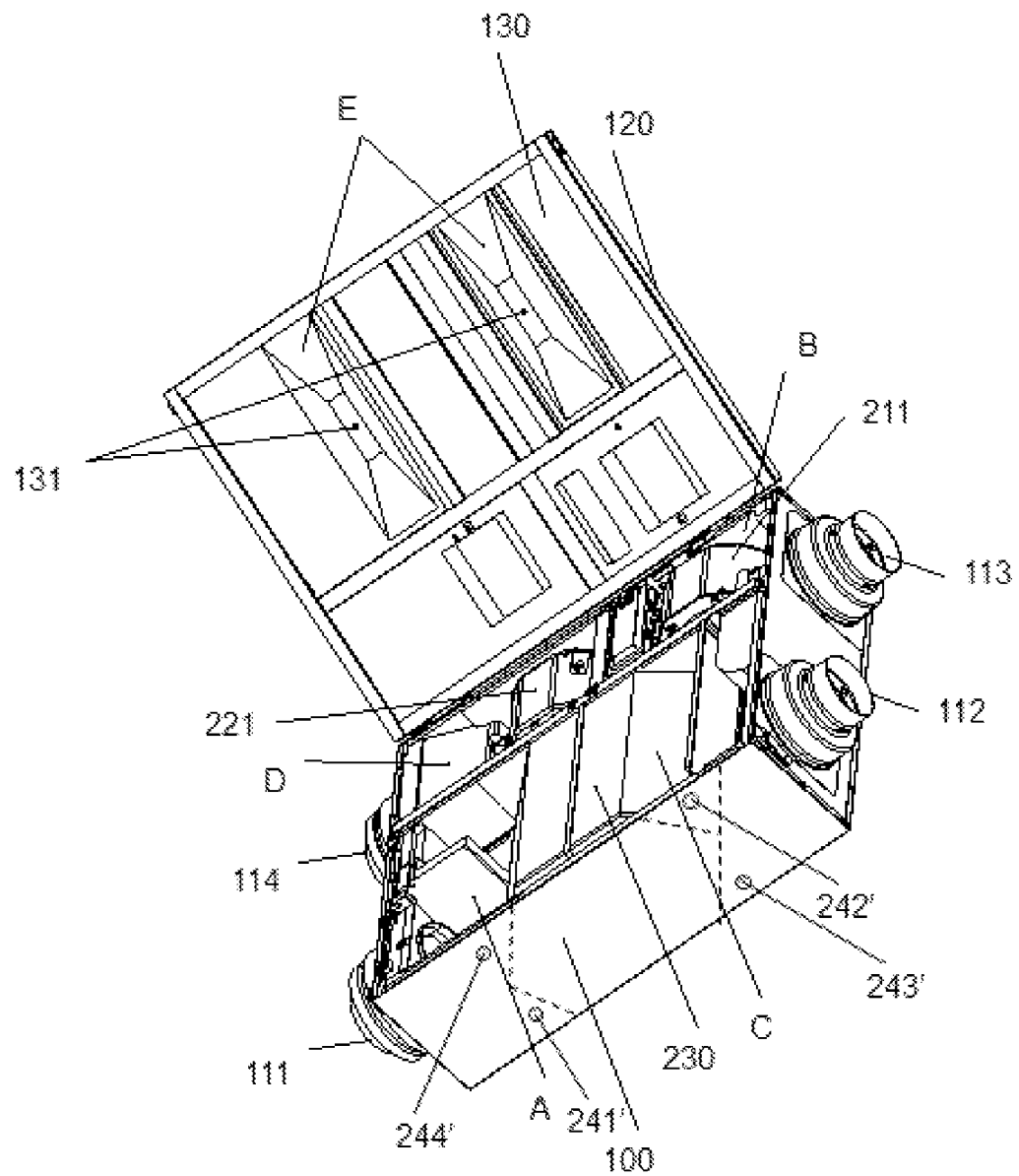
FIG. 10 is a schematic view of the orifice of the heat exchanger shown in FIG. 2 when it is mounted on a wall other than the ceiling.

As shown in FIG. 10, when the ventilating device is mounted on a wall other than the ceiling, the orifices 241', 242', 243', 244' may be provided on a surface acted as a bottom surface of the frame 100.

In this case, the orifices 121 include a first orifice 241' provided in the air supply path 210 at a position where the air hasn't reached the heat exchanging element 230 yet; a second orifice 242' provided in the air supply path 210 at a position where the air has already left the heat exchanging element 230; a third orifice 243' provided in the air discharge path 220 at a position where the air hasn't reached the heat exchanging element 230 yet; a fourth orifice 244' provided in the air discharge path 220 at a position where the air has already left the heat exchanging element 230.

When the ventilating device is provided on the wall other than the ceiling, the electronics device, or the air supply fan 211 and the air discharge fan 221 are both provided on the upper portion of the ventilating device.

With the above-described structure, the target effect of the present application may be achieved even if the ventilating device is not provided on the ceiling.

Heretofore, the heat exchanger of the embodiment of the present disclosure has been described in detail with reference to the drawings.

As described above, the present disclosure may be applied to a ventilating device such as an air blower, in addition to a heat exchanger. According to the above description, the person skilled in the art should have a clear understanding of the ventilating device of the present disclosure.

It is to be understood that the implementations not shown or described in the drawings or the description are in the form known to those of ordinary skill in the art and are not described in detail herein. In addition, the above-described definitions of the elements and methods are not limited to the various specific structures, shapes or modes mentioned in the embodiments, and one of ordinary skill in the art may simply change or replace them.

It should also be noted that this article may provide an example of a parameter that contains a particular value, but these parameters need not be exactly equal to the corresponding value, but may be approximated to an appropriate value within an acceptable error tolerance or design constraint. The direction terms mentioned in the examples, such as "up", "down", "front", "behind", "left", "right" and the like, are merely directions with reference to the drawings and are not intended to limit the protection scope of the present disclosure.

In view of the above, in the present disclosure, an orifice for drainage is not additionally provided elsewhere, but a part (or all) of orifices for measuring static pressure are/is used for drainage. Based on this, the orifices and the relevant components on the panel 120 have been improved, thereby reducing the production costs and improving the convenience of use, with good practical value.

The foregoing detailed embodiment has further described the objects, technical solutions and advantages of the present disclosure in detail. However, it should be understood that the forgoing embodiment is only the specific embodiments of the present disclosure and is not intended to limit the scope of the present disclosure. Any modifications, equivalents, improvements, etc., which are within the spirit and principles of the present disclosure, are intended to be included within the scope of the present disclosure.

What is claimed is:

1. A ventilating device, comprising:
   a frame forming an outer contour,
   an airflow path formed by a flowing of air inside the frame,
   a plurality of orifices provided on the frame, and
   a plurality of fixing bolts each provided in a respective orifice and being rotatable with respect to the respective orifice between a first position, in which the respective fixing bolt cannot be removed from the respective orifice and is configured to fix a measuring tube of different sizes of a static pressure gauge therein so as to measure a static pressure in a chamber where the airflow path is located, and a second position, in which the respective fixing bolt can be removed from the respective orifice so as to drain water out of the frame via the respective orifice;
   wherein each fixing bolt comprises a fixing bolt body of a hollow truncated cone shape, the fixing bolt body comprising:
   a first bottom surface extending into the frame and provided with a first opening,
   wherein the first opening is adapted to communicate the air inside the frame with the static pressure gauge when the static pressure gauge is inserted into the fixing bolt body, and
   a second bottom surface positioned outside of the frame and provided with a second opening.

2. The ventilating device according to claim 1, wherein,
   the airflow path comprises an air supply path for allowing the air to flow from outside to a room, and an air discharge path for allowing the air to flow from the room to outside;
   a heat exchanging element for exchanging energy between indoor air and outdoor air is provided at an intersection position between the air supply path and the air discharge path; and
   the plurality of orifices are provided in the airflow path at a position where the air has not reached the heat exchanging element yet or in the airflow path at a position where the air has already left the heat exchanging element.

3. The ventilating device according to claim 1, wherein a surface of the frame is provided with a panel capable of being opened and closed, and the plurality of orifices are provided on the panel.

4. The ventilating device according to claim 1, wherein,
   each fixing bolt further comprises an outer flange provided in an insertion direction of the measuring tube and having a larger diameter than each of the plurality of orifices,
   wherein a stopper extending outwardly in a rotational direction of each fixing bolt is provided on a surface of the outer flange facing the fixing bolt body, and the outer flange is formed with a third opening communicating with the second opening;

one end of the stopper is provided with a hook portion and the other end thereof is provided with a connecting portion connected to the outer flange; and each of the plurality of the orifices comprises a main orifice portion through which the fixing bolt body passes, and a lateral orifice portion through which the stopper passes.

5. The ventilating device according to claim 4, wherein, an observation hole corresponding to the stopper is provided on the outer flange; and a recess or a projection is provided on the outer flange.

6. The ventilating device according to claim 4, further comprising a plurality of covers each for covering each fixing bolt, wherein each cover comprises a covering portion covering the third opening, and an engaging portion adapted to be engaged into the second opening;

wherein the engaging portion is provided with a notch for enabling deformation of the engaging portion, and a gap is formed between the covering portion and the third opening; and when the respective fixing bolt is in the first position, the cover is detached from the respective fixing bolt; and when the fixing bolt is in the second position, the cover along with the fixing bolt is removed from the frame.

7. The ventilating device according to claim 3, wherein, an inner wall of the panel is provided with a thermal insulating member preventing heat exchange between the air inside the ventilating device and the air outside the ventilating device, and the thermal insulating member is provided with a guide hole penetrating through the thermal insulating member.

8. The ventilating device according to claim 7, wherein, a water storage portion recessed towards the panel is formed on the thermal insulating member, and the guide hole is provided at a lowest point of the water storage portion.

9. The ventilating device according to claim 1, wherein, the ventilating device is an air blower or a heat exchanger.

10. The ventilating device according to claim 1, wherein when the ventilating device is mounted on a wall other than a ceiling, the plurality of orifices are provided on a surface acted as a bottom surface of the frame.

11. The ventilating device according to claim 4, wherein by rotating the respective fixing bolt in a first direction, the respective fixing bolt is rotated to the first position, in which the fixing bolt body and the stoppers are not aligned with the main orifice portion and the lateral orifice portions, respectively; and by rotating the respective fixing bolt in a second direction opposite to the first direction, the respective fixing bolt is rotated to the second position, in which the fixing bolt body and the stoppers are aligned with the main orifice portion and the lateral orifice portions, respectively.

12. The ventilating device according to claim 11, wherein in the first position, the hook portion of the stopper is adapted to come into contact with an inner wall of the frame, and the connecting portion is adapted to come into contact with an edge of the lateral orifice portion; and in the second position, the hook portion of the stopper is adapted to separate from the inner wall of the frame, and the connecting portion is adapted to separate from the edge of the lateral orifice portion.

* * * * *